US006684635B2

(12) United States Patent
Franz

(10) Patent No.: US 6,684,635 B2
(45) Date of Patent: Feb. 3, 2004

(54) SYSTEM AND METHOD FOR CONTROLLING MOTOR TORQUE

(75) Inventor: Maurice F. Franz, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 95 days.

(21) Appl. No.: 10/026,759

(22) Filed: Dec. 27, 2001

(65) Prior Publication Data

US 2003/0205044 A1 Nov. 6, 2003

(51) Int. Cl.[7] ............................................... F16D 31/03
(52) U.S. Cl. ................................................... 60/448
(58) Field of Search ........................ 60/448, 449, 451, 60/452, 476, 487, 490

(56) References Cited

U.S. PATENT DOCUMENTS

| | | | | |
|---|---|---|---|---|
| 3,890,360 A | * | 6/1975 | Pruvot et al. ................. | 60/431 |
| 4,132,072 A | * | 1/1979 | Schlinke ....................... | 60/443 |
| 4,879,501 A | * | 11/1989 | Haner .......................... | 318/645 |
| 5,062,498 A | * | 11/1991 | Tobias .......................... | 60/413 |
| 5,492,451 A | | 2/1996 | Franz et al. ................. | 417/312 |
| 5,568,762 A | | 10/1996 | Manring ....................... | 92/143 |
| 6,035,828 A | | 3/2000 | Anderson et al. ........... | 123/446 |
| 6,142,110 A | | 11/2000 | Bartley et al. ........... | 123/41.49 |
| 6,234,758 B1 | | 5/2001 | Pawelski ...................... | 417/26 |

* cited by examiner

Primary Examiner—Edward K. Look
Assistant Examiner—Igor Kershteyn
(74) Attorney, Agent, or Firm—Finnegan, Henderson, Farabow, Garrett & Dunner; Steve M Hanley

(57) ABSTRACT

A method is provided for controlling a torque output of an hydrostatic motor in fluid communication with a variable displacement pump. At least one of the motor and pump has variable displacement capabilities. The method includes monitoring at least one motor condition of the hydrostatic motor and determining a displacement signal corresponding to the monitored motor condition. The variable displacement capabilities are controlled based on the displacement signal to reduce a torque ripple in the torque output of the hydrostatic motor.

20 Claims, 3 Drawing Sheets

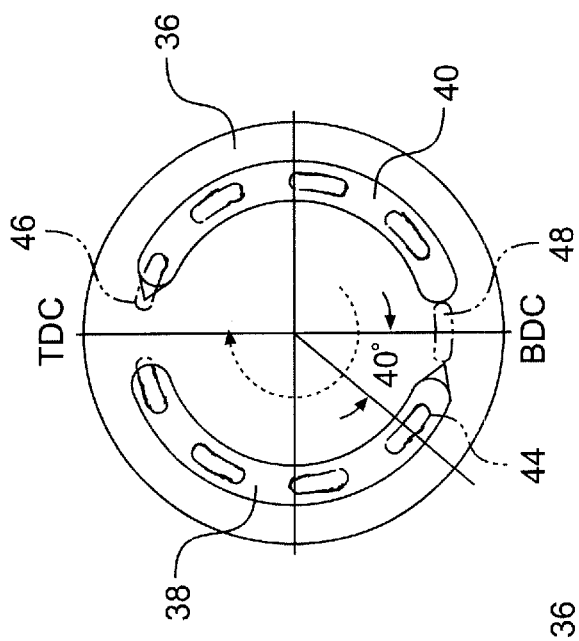
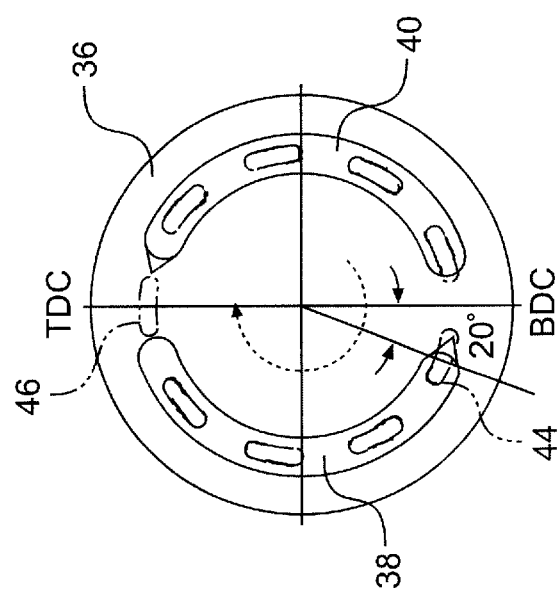
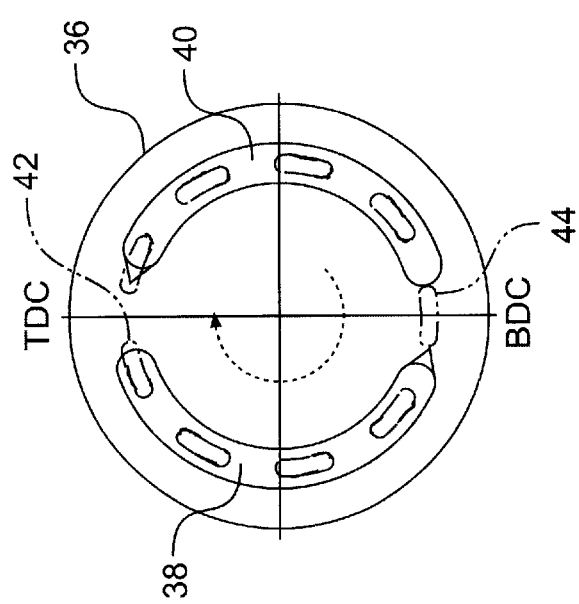

SYSTEM AND METHOD FOR CONTROLLING MOTOR TORQUE

TECHNICAL FIELD

The present invention is directed to a system and method for controlling a motor torque output. More particularly, the invention relates to a system and method for controlling a motor torque output by monitoring an operating condition of a hydrostatic motor.

BACKGROUND

A pump having a variable displacement capability is well known in the industry to drive a hydrostatic motor. In a machine having a variable displacement pump and a hydrostatic motor, such as an excavator or a loader, the pump provides fluid to the hydrostatic motor and drives the motor in the forward or reverse direction. The speed of the hydrostatic motor is controlled by varying the displacement of the pump.

A variable displacement pump generally includes a drive shaft, a rotatable cylinder barrel having multiple piston bores, pistons held against a tiltable swashplate, and a valve plate. When the swashplate is tilted relative to the longitudinal axis of the drive shaft, the pistons reciprocate within the piston bores to produce a pumping action. Each piston bore is subject to intake and discharge pressures during each revolution of the cylinder barrel.

Similarly, a hydrostatic motor includes an output drive shaft, a rotatable cylinder barrel having multiple piston bores, pistons disposed in the bores, a swashplate, and a valve plate. The pistons reciprocate within the piston bores to produce a pumping action. Each piston bore is subject to intake and discharge pressures during each revolution of the cylinder barrel. The pumping action by the pistons rotates the cylinder barrel and the output drive shaft, thereby providing a motor torque output.

In a hydrostatic motor, the total fluid flow through the motor to produce the torque output is geometrically proportional to the sum of the velocities of the individual pistons between the bottom dead center (BDC) and the top dead center (TDC) positions. A hydrostatic motor often has an odd number of pistons and piston bores in the cylinder barrel. When the motor has, for example, nine pistons and corresponding pistons bores, there may be five pistons pressurized at a certain rotational position of the cylinder barrel and four pistons pressurized at another rotational position. This difference in the number of the pressurized pistons in a revolution of the piston barrel results in variation in the motor torque output, also known as a motor torque ripple.

The torque ripple is not limited to motors having an odd number of pistons. In a motor having an even number of pistons, the numbers of the pressurized pistons may change as the motor rotates, and this also can result in a motor torque ripple. In addition to the above described causes for the torque ripple, minor geometrical changes and port timing can contribute to the motor torque ripple.

The motor torque ripple from the hydrostatic motor may be transmitted to other components in the machine and produce undesirable noise and vibrations. Moreover, the motor torque ripple can exert a stress on other components in the machine, thereby decreasing machine life. Motor torque ripple is more troublesome at low motor speeds or low motor piston pass frequencies, which occur at the start of the motor, and can result in a jerk motion at the start of the machine.

Various attempts have been made to reduce noise in hydraulic systems. For example, U.S. Pat. No. 5,492,451 discloses a system and method for attenuating fluid-borne noise from a pump. The system includes a mechanism for sensing a flow ripple produced by the pump, and a mechanism for transmitting a signal to a negative ripple generator to cancel the flow ripple.

However, the disclosed system does not control the displacement of the pump or motor to reduce a motor torque ripple at a motor torque output.

Thus, it is desirable to provide a torque control system that provides flexible control of a pump or motor to reduce a motor torque ripple in real time. The present invention is directed to solving one or more of the shortcomings associated with prior art designs.

SUMMARY OF THE INVENTION

In one aspect, a method is provided for controlling a torque output of an hydrostatic motor in fluid communication with a pump. At least one of the motor and pump has variable displacement capabilities. The method includes monitoring at least one motor condition of the hydrostatic motor and determining a displacement signal corresponding to the monitored motor condition. The variable displacement capabilities are controlled based on the displacement signal to reduce a torque ripple in the torque output of the hydrostatic motor.

In another aspect, a system is provided for controlling a torque output of a hydrostatic motor in fluid communication with a pump. At least one of the motor and pump has variable displacement capabilities. The system includes a sensor assembly for monitoring at least one motor condition of the hydrostatic motor and an actuator configured to control the variable displacement capabilities of the motor or pump. A controller is electrically coupled to the sensor assembly and the actuator, and the controller is configured to determine a displacement signal corresponding to the motor condition and control the variable displacement capabilities based on the displacement signal to reduce a torque ripple of the torque output of the hydrostatic motor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

FIG. 2A is a diagrammatic representation of a valve face of a hydrostatic motor overlying a cylinder barrel and having piston ports at the BDC position;

FIG. 2B is a diagrammatic representation of the valve face of FIG. 2A with the piston ports rotated 20 degrees;

FIG. 2C is a diagrammatic representation of the valve face of FIG. 2A with the piston ports rotated 40 degrees.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
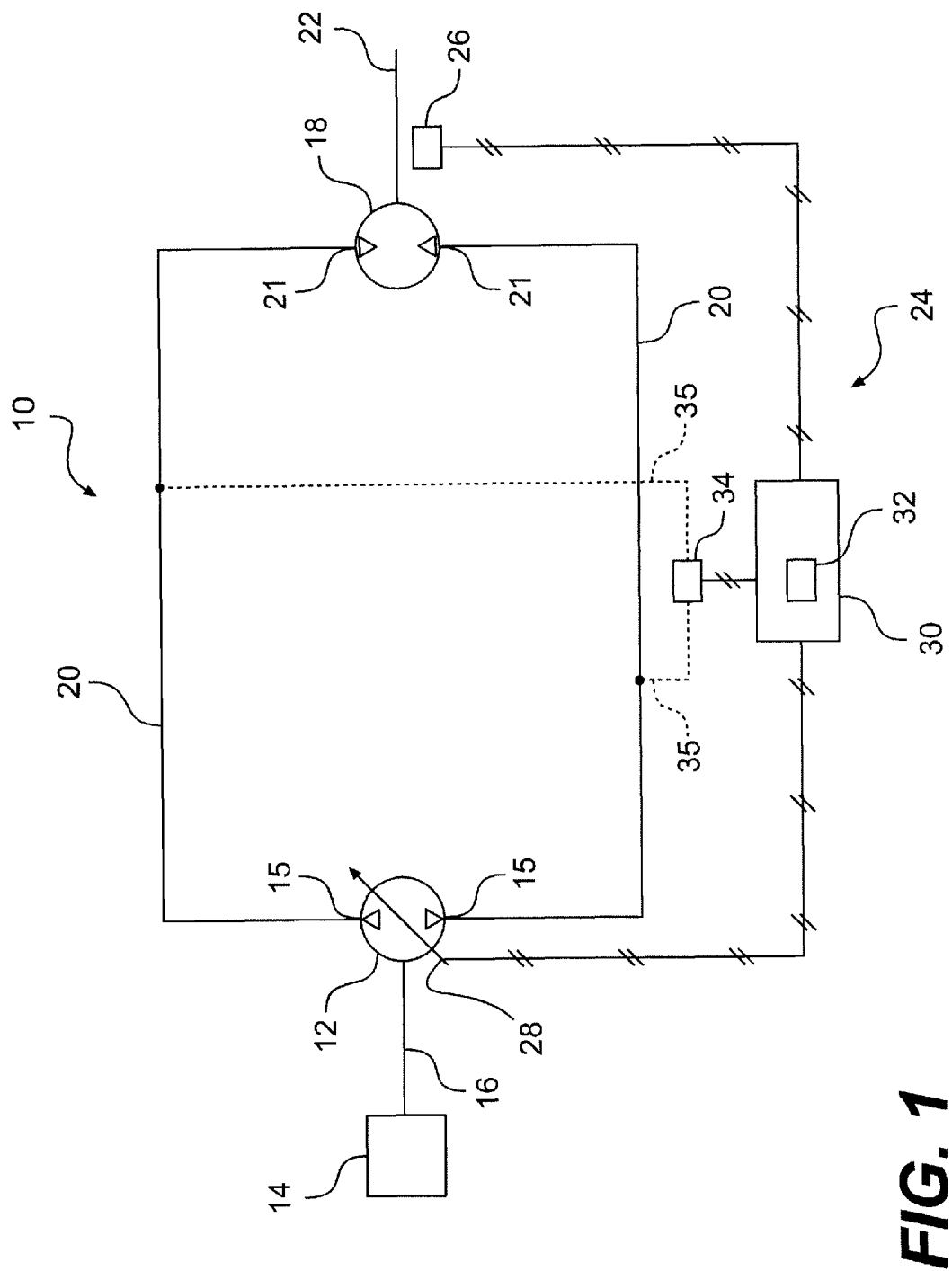
FIG. 1 is a schematic and diagrammatic representation of a machine having a system for controlling a motor torque output according to one exemplary embodiment of the present invention.

FIG. 1 schematically and diagrammatically illustrates a machine having a system for controlling motor torque output according to one exemplary embodiment of the invention. The machine 10 shown in FIG. 1 may be an excavator, a loader, or any other piece of equipment utilizing a hydraulic system.

The machine 10 includes a pump 12 typically driven by an engine 14, such as an internal combustion engine, via a drive train 16. In an exemplary embodiment, the pump 12 is a variable displacement pump and can vary its displacement between minimum and maximum displacement positions. Typically, the pump 12 includes pump ports 15, a drive shaft (not shown), a rotatable cylinder barrel having multiple piston bores (not shown), and pistons held against a tiltable swashplate (not shown). The swashplate is tilted relative to the longitudinal axis of the drive shaft, and the pistons reciprocate within the piston bores to produce a pumping action. One skilled in the art appreciates the basic structure of a variable displacement pump, and the structure will not be described or shown in detail.

The machine 10 also includes a hydrostatic motor 18 in fluid communication with the pump 12 via common fluid rails 20. The common fluid rails 20 supply the high pressure fluid from the pump 12 to the hydrostatic motor 18 and return the fluid from the motor 18 to the pump 12. The hydrostatic motor 18 includes motor ports 21, an output drive shaft 22, a rotatable cylinder barrel having multiple piston bores (not shown), pistons disposed in the bores (not shown), and a valve plate (see FIGS. 2A–C). The output drive shaft 22 is coupled to a load (not shown) and transmits a torque output to the load.

FIGS. 2A–C illustrate a valve plate 36 of the hydrostatic motor 18 having nine pistons. The valve plate 36 has an elongated inlet passage 38 and an elongated outlet passage 40. The inlet and outlet passages 38, 40 are in fluid communication with the rails 20 (FIG. 1). The valve plate 36 overlays nine piston ports 42 provided in the cylinder barrel. As is well known in the art, the piston ports 42 are equally spaced from one another and are disposed in the cylinder barrel (not shown) and rotate relative to the inlet and outlet passages 38, 40 of the valve plate.

The cylinder barrel of the motor 18 has a BDC position and a TDC position. In FIG. 2A, a first piston port 44 is illustrated at the BDC position. In this position, the first piston port 44 is not in fluid communication with the inlet passage 38 and the outlet passage 40. At this position, the first piston port 44 is empty of hydraulic fluid and is ready to take the hydraulic fluid from the inlet passage 38 as the barrel rotates in a clockwise direction.

In FIG. 2B, the piston ports 42 have rotated 20 degrees from the BDC position. At this position, a second piston port 46 of the nine piston ports 42 is at the TDC position. In this position, the second piston port 46 is not in fluid communication with the inlet or outlet passage 38, 40. The second port 46 in this position is filled with hydraulic fluid and is ready to discharge it into the outlet passage 40 as it continues to rotate clockwise.

In FIG. 2C, the first piston port 44 is illustrated after being rotated 40 degrees from the BDC position illustrated in FIG. 2A. In this position, a third piston port 48 of the nine piston ports 42 is at the BDC position. In a hydrostatic motor having nine pistons ports, a different piston port is at the BDC position for every 40 degrees of rotation of the cylinder barrel. Since the sum of the velocities of the pistons may not be constant throughout each 40-degree rotation of the cylinder barrel, the total flow into the inlet passage 38 may not be constant, resulting in a torque ripple at the motor output shaft 22. Therefore, the total flow into the inlet passage 38 may not be constant, thereby resulting in speed or torque variations or ripple in the motor output shaft 22. Also, the effective number of pistons under pressure changes as the pistons rotate between the BDC and TDC positions, resulting in output torque ripple. Moreover, as each piston enters or leaves the port 42, the pressure in the piston chamber changes from zero to high rail pressure at the BDC position and from the high rail pressure to zero at the TDC position. This occurs in a finite time and results in effective torque ripple in the motor shaft 22.

As shown in FIG. 1, the machine 10 also includes a torque control system 24. The torque control system 24 includes a sensor assembly 26 to monitor a motor condition of the hydrostatic motor 18. In one exemplary embodiment, the motor condition may be a rotational speed and an angular shaft position of the motor output shaft 22. While these could be considered separate conditions, it is contemplated that this embodiment would likely require the monitoring of both. Because the motor output shaft 22 is coupled to the cylinder barrel of the motor 18, the rotational speed and position of the cylinder barrel of the motor 18 can be determined by monitoring the rotational speed and angular shaft position of the motor output shaft 22. The rotational speed and angular shaft position can be monitored by, for example, an optical sensor or any other suitable sensor assembly known to those skilled in the art.

In another exemplary embodiment, the motor condition may be an actual torque output of the motor output shaft 22. In this case, the sensor assembly 26 would monitor the actual torque output of the motor output shaft 22. The torque output can be monitored through, for example, a stain gauge, an accelerometer, or any other sensor capable of monitoring an actual torque output.

Though the rotational speed and angular shaft position or the actual torque output of the motor output shaft 22 are described as some examples of the motor condition, the motor condition of the present invention should not be limited to these conditions. Alternatively, other motor conditions may be monitored, as is customary, to provide an input to control a torque output.

While FIG. 1 illustrates the sensor assembly 26 located at the motor output shaft 22, the location of the sensor assembly 26 of the present invention is not limited to that specific arrangement. The sensor assembly 26 can be placed at any location suitable to monitor a desired motor condition. One skilled in the art will appreciate that any sensor assembly capable of ascertaining a desired motor condition of the motor 18 may be utilized.

The torque control system 24 also includes an actuator 28 coupled to the pump 12. In one exemplary embodiment, the actuator 28 is coupled to the swashplate of the pump 12 and moves the swashplate to vary the displacement of the pump 12.

As shown in FIG. 1, the torque control system 24 includes a controller 30 electrically coupled to the sensor assembly 26 and the actuator 28. The controller 30 receives a motor condition signal from the sensor assembly 26 and sends a displacement signal to the variable displacement pump 12. The signal may be utilized to adjust the displacement and output pressure of the pump 12, thereby reducing torque ripple at the motor torque output.

Based on the motor condition signal from the sensor assembly 26, the controller 30 determines a corresponding displacement signal that is fed to the actuator 28 to provide a substantially constant torque output of the hydrostatic motor 18. In one exemplary embodiment, the controller 30 may include a look-up table or map to determine the displacement signal that corresponds to the motor condition signal. The look-up table may include the corresponding displacement signal for multiple values of the motor condition being monitored. In one exemplary embodiment, the table may contain an estimated torque ripple for a particular rotational speed and shaft position of the hydrostatic motor 18 and/or a rail pressure differential, and a corresponding displacement signal to the pump 12 to reduce the torque ripple. For example, the table may provide a certain displacement signal to reduce the torque ripple when the rotational speed of the motor output shaft 22 is in the range of 0–100 rpm. For the rotational speed between 100–500 rpm, the table may provide a certain displacement signal. For the rotational speed exceeding 500 rpm, the table may provide another displacement signal. The table or map may be empirically created prior to the operation of the machine 10, in its ultimate work environment, for example, during either a test run or a lab test, and may be prestored in a memory 32 in the controller 30.

In another embodiment, the controller 30 may store a mathematical equation(s) that calculates a displacement signal from a motor condition signal. The equation may define the displacement signal as a function of the motor condition signal that represents the motor condition, such as a rotational speed and position of the motor output shaft 22 or a torque output. The mathematical equation(s) may be stored in a memory of the controller 30.

In another exemplary embodiment, the controller 30 may provide a displacement signal to the actuator 28 based on a fuzzy logic. Typically, a control system based on a fuzzy logic influences the behavior of a system by changing an input or inputs to that system according to a rule or a set of rules that model how the system operates. The torque control system 24 using the fuzzy logic would receive the motor condition signal from the sensor assembly 26, and a displacement signal to the actuator 28 would be changed by the motor condition signal according to a certain rule to reduce the torque ripple. For example, several mathematical equations may be stored in the memory of the controller 30 for each set of operating conditions. The equations are progressively provided. The fuzzy logic may analyze the result of using a first equation and then another equation that is progressively provided on both sides of the first equation, compare the results of all three equations, and selects on the equation that gives the best results, i.e., the lowest torque ripple. The fuzzy logic may be stored in a memory of the controller 30, and it may be provided in a software, a hardware, or any other suitable platform.

In one exemplary embodiment, the torque control system 24 may include a pressure sensor 34 for monitoring a rail pressure differential in the rails 20. Pilot lines 35 are in fluid communication with the rails 20 and the pressure sensor 34 to monitor the rail pressure differential. The pressure sensor 34 is electrically connected to the controller 30. In this embodiment, the controller 30 may use a rail pressure differential as another variable in determining a displacement signal to reduce the torque ripple at the motor output shaft 22.

Based on the displacement signal from the controller 30, the actuator 28 varies the displacement of the variable displacement pump 12. The change in the pump displacement adjusts the rotation of the hydrostatic motor 18 to reduce the torque ripple.

Figure 3:
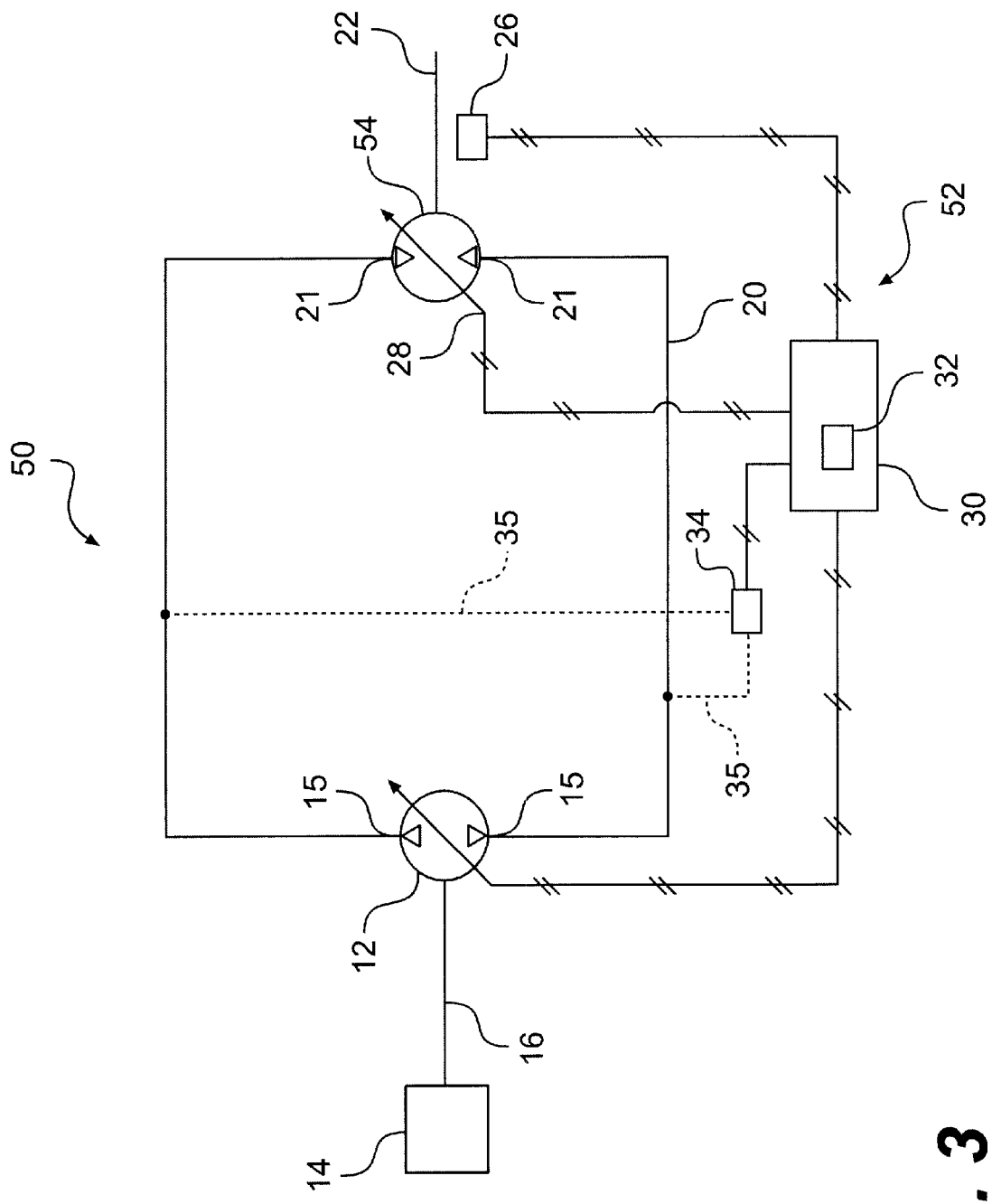
FIG. 3 is a schematic and diagrammatic representation of a machine having a system for controlling a motor torque output according to another exemplary embodiment of the present invention.

FIG. 3 schematically and diagrammatically illustrates a machine 50 having a torque control system 52 according to another exemplary embodiment of the invention. The same reference numbers as in FIG. 1 are used in the FIG. 3 to refer to the same or like parts.

The machine 50 shown in FIG. 3 includes a pump 12 in fluid communication with a hydrostatic motor 54. In this exemplary embodiment, the hydrostatic motor 54 is a variable displacement type. The torque control system 52 includes the controller 30 electrically coupled to the variable displacement motor 54. Based on the motor condition signal from the sensor assembly 26, the controller 30 determines a displacement signal and sends it to the hydrostatic motor 54. The hydrostatic motor 54 then changes its displacement to reduce the torque ripple. If the pump 12 is a variable displacement type, the displacement of the pump 12 may be fixed during this operation.

INDUSTRIAL APPLICABILITY

Referring to FIG. 1, the sensor assembly 26 monitors a motor condition, such as a rotational speed and an angular shaft position or an actual torque output of the motor output shaft 22, of the hydrostatic motor 18. A motor condition signal that represents the monitored motor condition is then sent from the sensor assembly 26 to the controller 30, which is electrically coupled to the sensor assembly 26.

A displacement signal determined from the monitored motor condition is then sent from the controller 30 to the actuator 28. Based on the displacement signal, the actuator 28 varies the displacement of the variable displacement pump 12. The change in the pump displacement adjusts the flow and pressure in the high pressure side of the rails 20, which in turn adjusts the rotation of the hydrostatic motor 18 to reduce the torque ripple at the motor torque output. In another embodiment, a displacement signal determined by the controller 30 is sent to the actuator of the hydrostatic motor 54 to vary the displacement of the hydrostatic motor 54 to reduce the torque ripple at the motor output shaft 22.

The present invention provides a torque control system and method for allowing flexible control of a pump or motor to reduce a motor torque ripple in real time. The torque control system and method according to this invention can provide flexible control of a pump or motor to reduce a torque ripple in a variety of work machines and under a variety of conditions. By doing so, the actual torque output can be kept constant or substantially constant despite conditions that would normally cause torque variance.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a torque output of a hydrostatic motor in fluid communication with a pump, at least one of the motor and pump having variable displacement capabilities, comprising:

monitoring at least one motor condition of the hydrostatic motor;

determining a displacement signal corresponding to the monitored motor condition; and controlling the variable displacement capabilities based on the displacement signal to reduce a torque ripple of the torque output of the hydrostatic motor, wherein the variable displacement capabilities are systematically controlled in response to the monitored motor condition.

2. The method of claim 1, wherein the motor condition being monitored is a rotational speed and an angular shaft position of the hydrostatic motor.

3. The method of claim 1, wherein the motor condition being monitored is an actual motor torque output of the hydrostatic motor.

4. The method of claim 1, wherein the displacement signal is determined from a table including a corresponding displacement signal for a plurality of values of the monitored motor condition.

5. The method of claim 4, further including empirically determining contents of the table.

6. The method of claim 1, wherein the displacement signal is determined by a mathematical equation defining the displacement signal as a function of the motor condition.

7. The method claim 1, wherein the displacement signal is determined by a fuzzy logic, the fuzzy logic having a rule to determine the displacement signal based on the motor condition.

8. The method of claim 1, wherein the pump has the variable displacement capabilities and the displacement signal is sent to the pump to control the displacement capabilities thereof.

9. The method of claim 1, wherein the hydrostatic motor has the variable displacement capabilities and the displacement signal is sent to the motor to control the displacement capabilities thereof.

10. The method of claim 1, further including monitoring a rail pressure differential at conduits in fluid communication with the pump and the hydrostatic motor, the monitored pressure differential being used to determine the displacement signal.

11. A system for controlling a torque output of a hydrostatic motor in fluid communication with a pump, at least one of the motor and pump having variable displacement capabilities, the system comprising:

a sensor assembly for monitoring at least one motor condition of the hydrostatic motor;

an actuator configured to control the variable displacement capabilities of the motor or pump; and a controller electrically coupled to the sensor assembly and the actuator, the controller being configured to determine a displacement signal corresponding to the motor condition and to control the variable displacement capabilities based on the displacement signal to reduce a torque ripple of the torque output of the hydrostatic motor.

12. The system of claim 11, wherein the motor condition is a rotational speed and an angular shaft position of the hydrostatic motor.

13. The system of claim 11, wherein the motor condition is an actual motor torque output of the hydrostatic motor.

14. The system of claim 11, wherein the controller includes a table having a corresponding displacement signal for a plurality of values of the monitored motor condition.

15. The system of claim 14, wherein controller includes a memory storing the table.

16. The system of claim 11, wherein the controller includes a memory storing a mathematical equation defining the displacement signal as a function of the motor condition.

17. The system of claim 11, wherein the controller includes a memory storing a fuzzy logic module, the fuzzy logic module having a rule to determine the displacement signal based on the motor condition to reduce the torque ripple.

18. The system of claim 11, wherein the actuator is coupled to the pump and the displacement signal is sent to the actuator to control the displacement capabilities of the pump.

19. The system of claim 11, wherein the actuator is coupled to the motor and the displacement signal is sent to the actuator to control the displacement capabilities of the motor.

20. The system of claim 11, further including a sensor electrically coupled to the controller for monitoring a rail pressure differential at conduits in fluid communication with the pump and the motor, the monitored rail pressure differential being used to determine the displacement signal.

* * * * *